United States Patent Office 3,446,865
Patented May 27, 1969

3,446,865
CATALYST AND CATALYTIC PROCESS
James F. Roth, St. Louis, and Andrew R. Schaefer, Greve Coeur, Mo., assignors to Monsanto Company, St. Louis, Mo., a corporation of Delaware
No Drawing. Continuation-in-part of application Ser. No. 465,735, June 21, 1965. This application May 2, 1968, Ser. No. 726,245
Int. Cl. C07c 5/14, 5/18, 5/30
U.S. Cl. 260—669
14 Claims

ABSTRACT OF THE DISCLOSURE

This invention relates to an improved catalyst for the conversion of hydrocarbons. The invention may be applied to processes including dehydrogenation, dehydrocyclization, reforming, hydrocracking, isomerization and hydrogenation. The improved catalyst is characterized by freedom from poisoning, high physical strength, and long life and contains free radical properties which aid in carrying out the said catalytic reactions. The improved catalyst comprises from 0.1 to 30% by weight of carbon, referred to the composite catalyst, deposited by the condensation of unsaturated hydrocarbons, the said carbon being disposed upon a porous low acidity support having an acidity factor of no more than 2.0. The catalyst may also contain 0.1 to 5% by weight of a metal selected from the group consisting of alkali and alkaline earth metal compounds.

---

The present application is a continuation-in-part of copending patent application Ser. No. 465,735 filed June 21, 1965, and now abandoned.

The present invention relates to catalysis including a novel catalyst, and processes for making and employing such catalyst.

It is an object of the invention to provide a new catalyst which is economical and is also characterized by freedom from poisoning, high physical strength and long life. Another object of the invention is to provide a catalyst which is useful for various catalytic reactions including dehydrogenation, dehydrocyclization, reforming, hydrocracking, isomerization, hydrogenation, etc. It is also an object of the invention to provide a catalyst which has free radical properties to aid in carrying out the said catalytic reactions.

Another object of the invention is the provision of a catalyst which is easily prepared from economical starting materials and is characterized by high physical strength, both in fixed bed operations and also in fluid catalytic processes, and which is also characterized by long life and the ability to withstand common catalytic poisons.

Conventional catalysts used in commercial processes for dehydrogenation, aromatization, etc., have generally employed metals and metal oxides and other metal compounds as the active catalytic components. Such catalysts are generally quite expensive, particularly when employing a noble metal catalyst such as platinum or palladium. Furthermore, the effectiveness of such catalysts during operation is deleteriously affected by water vapor which permanently deactivates conventional metal catalysts.

It has now been found that a highly effective catalyst for hydrocarbon conversion reactions, such as dehydrogenation, dehydrocyclization, reforming, isomerization, hydrocracking and hydrogenation consists of carbonaceous matter resulting from the condensation of hydrocarbons, preferably a form of carbonaceous matter that is paramagnetic. This catalyst as described in further detail below is generally utilized upon a catalyst support. The preferred types of supports are set forth in the table below. This table also shows some of the promoters, existing as free metal or as compounds on the catalyst, which while not essential are often advantageous in improving the properties of the present catalyst.

SUPPORTS

Dehydrogenation and dehydrocyclization

Supports.—Gamma alumina, eta alumina, alpha alumina, magnesia, silica, silicates, titania, lime, zirconia, with acidity factor no more than 2.0 (defined below).

Promoters.—Alkali, (e.g., Na, K); alkaline-earth, (e.g., Ca, Mg); Group IB (e.g., Cu Ag); Group IIB (e.g., Hg); Group VIB (e.g., Cr, Mo, W); Group VIII (e.g., Fe, Co, Ni, Pt, Pd).

Reforming, hydrocracking, isomerization supports for carbon utilize above group of supports in admixture with at least one of the following acidic components: silica-alumina, silica, silica-magnesia, gamma or eta alumina, with acidity factor (defined below) no less than 3.0, either without or preferably with halide (greater than 0.1% by weight Cl, or F).

Promoters.—Cl, F, Group VIII transition metals such as Pt, Fe, Co; Group VIB (Cr, Mo, W).

Hydrogenation

Supports.—$\gamma$-$Al_2O_3$ with acidity factor of alumina no more than 2.0.

Promoters.—Group VIII metals, e.g., Pt, Pd, Ru, Rh, Re, Ir at 0.1–2.0 wt. percent of total catalyst.

In the case of supports intended for use with carbon for dehydrogenation or dehydrocyclization, it is often desired that a catalyst composite of low acidity be used. Low acidity, if not characteristic of the original carrier, can be attained by incorporation of alkali or alkaline earth metal compounds in the range of 0.1 to 10% by weight of such compounds, calculated as metal, based on the weight of the composite carbon-containing catalyst. Some alkali metals also have the ability to catalyze the water gas reactions which function when steam is a diluent. The method of measuring the acidity factor is discussed below.

Other metal promoters can also be incorporated for cooperative catalytic action together with the carbonaceous phase. These metal promoters may aid in different ways. They may assist in the dehydrogenation of various organic feedstocks to unsaturated intermediates that go on to condense and form the more active carbonaceous phase. In this sense their function is to aid in forming the final desired catalytic composition. In addition, metals may also enhance the dehydrogenation activity of the formed carbonaceous phase from which most but not all activity is derived.

While the present dispersed carbon catalyst base is not primarily a hydrogenation catalyst, this base when used with a metal such as platinum or palladium has considerable utility as a hydrogenation catalyst.

In the case of catalysts adapted for reforming, isomerization and hydrocracking, appreciable acidity is desired. The halide promoters can be used to enhance acidity. Also Group VIB metal oxides, e.g. those of Cr, Mo, W can be employed as promoters that introduce acidity and also may enhance dehydrogenation activity.

It has now been found that a highly effective catalyst for the above described catalytic reactions is obtained in the use of deposited carbon resulting from the condensation of an unsaturated carbon-containing feedstock to obtain non-volatile, higher molecular weight carbonaceous matter having a low hydrogen/carbon atom ratio as discussed below. The feedstocks are preferably hydrocarbons that are unsaturated in nature, such as benzene and other aromatic hydrocarbons, for example toluene, xylene ethylbenzene, styrene, alpha methyl-styrene and naphthalene; aliphatic saturated and unsaturated hydrocarbons including methane, ethane, propane, butane and longer chain compounds such as cyclohexane, decane, dodecane, etc. as well as the corresponding olefinic and acetylenic compounds such as ethylene, propylene, butylene, amylenes, decene, dodecene, cyclohexene; diolefins such as butadienes, cyclopentadiene, isoprene and acetylene, etc. The source of the deposited carbon is preferably an unsaturated hydrocarbon, which is charged during the depoistion period. However, the unsaturated hydrocarbon may also be formed in the reactor for example by charging a saturated feedstock, e.g. butane to a carrier such as alumina over which the saturated feed is dehydrogenated to butenes and butadienes. Such deposited carbon may be dispersed upon the carrier by passing the aforesaid feedstock into the heated reactor e.g. at a temperature of from 200° C. to 1400° C., a preferred range being 300° C. to 900° C. and a more preferred range being 400° C. to 800° C. The flow rate and pressure are not critical, so that atmospheric pressure may be used. The carbon catalyst may also be deposited upon the walls of a tubular or other shaped catalytic reactor which may also be composed of or contain carrier materials such as pumice, alumina gel, silica gel, silica-alumina gels, aged or deactivated silica alumina cracking catalyst, magnesia, diatomaceous earth, bauxite, titania, clays, both natural and acid treated, such as the Super-Filtrols, attapulgus clay, lime, magnesium silicate, carborundum, zeolites as well as the zeolitic molecular sieves and interspacing elements such as ceramic rods, balls, broken brick, tile and the like disposed within the reactor. The carrier material can have a promoter such as sodium or platinum present from impregnation or spraying processes before the deposition of carbon. However such promoters can also be applied to the carbon-deposited composite such as by supplying a promoter with the feed or by direct application of the promoter by spraying or impregnating the promoter precursor, e.g. $NaNO_3$ for sodium, to the composite catalyst in the reactor or upon a composite prepared in another vessel.

Broadly the present invention is predicated upon the discovery that a deposited carbon resulting from the condensation of unsaturated hydrocarbons is unusually effective as a catalyst for the hydrocarbon reactions discussed herein. Consequently, the specific form of carbon which is obtained is not a deleterious pitch or coke that reduces catalytic activity, but instead is catalytically active in promoting the reactions of dehydrogenation, cyclization, etc.

In the use of the present catalyst for dehydrogenation, for which the carbon is deposited upon a low acidity support such as a gama alumina having an acidity factor no more than 2.0, it is found that the carbon deposition occurs at an initial rate of less than 10 times that which occurs over a silica-alumina cracking catalyst. Furthermore the carbon deposited on a low acidity support has a higher intrinsic dehydrogenation activity than that deposited on a high acidity support such as is used in hydrocracking. This arises from a higher concentration of unpaired electrons as measured by electron spin resonance absorption, described below.

It is also found that the present catalytic carbon does not build up large deposits of coke during the course of the dehydrogenation, cyclization and other reactions described herein. In fact the hydrocarbon modifying reactions may be carried out at relatively high temperatures at which considerable carbon deposition would otherwise taken place, by feeding steam with the hydrocarbon charge stock. In this way the water gas reaction may be used to control the carbon content, for example at from 0.1% to 30%, or preferably 3% to 20% by weight of carbon on a support such as alumina, with the total weight referring to the composite catalyst. Such reactions have been found to permit prolonged continuous runs without the necessity for employing frequent regeneration of the catalyst.

The mechanism or mechanisms by which the present carbon catalyst functions to aid in carrying out the various reactions discussed herein is not completely clear. However, it has been found that a pronounced catalytic effect is obtained without the necessity of employing the conventional metallic and metal compound catalysts.

A very effective analytical tool which has been employed in studying the present catalytic phenomena is electron spin resonance analysis, herein designated as ESR. For example a catalyst of carbon (originally resulting from the thermal decomposition of styrene) upon a catalytically inactive gamma alumina is subjected to ESR analysis after having been employed for the dehydrogenation of ethylbenzene to styrene. The ESR analysis indicates an intense lien measured at 9.5 gc./s. At room temperature the g. value is 2.0027, and the line half-width is 500 milligauss. The absorption is extremely high in intensity indicating that a substantial number of unpaired electrons are present in the active carbon catalyst.

The presence of unpaired electrons in substantial quantity would appear to indicate that these electrons are capable of abstracting hydrogen atoms from hydrocarbons under reaction conditions such as in dehydrogenation, acid cracking, reforming, aromatizing, etc. thus initiating free radical reactions.

In the case of dehydrogenation, this reaction in accordance with the mechanism involving the carbon catalyst occurs by abstracting hydrogen atoms from the feed hydrocarbon. The unpaired electrons situated on the carbon are regenerated by recombination of hydrogen atoms to form molecular hydrogen and by the addition of hydrogen atoms to free radicals. Free radicals produced by the abstraction of one hydrogen atom can then undergo beta-scission to produce cracked products or as has been found in dehydrogenating 2,4,4-trimethylpentene-2, the reaction proceeds by a 1,2-vinyl shift to produce a 2,5-dimethylhexene-2-radical as an intermediate in the final production of para xylene.

Aromatization of acyclic hydrocarbons similarly proceeds through dehydrogenation to trienes. The trienes thermally cyclicize to $C_6$ cyclic dienes which then dehydrogenate to the aromatic product. An example of the latter case is the aromatization of n-heptane to produce toluene.

The essential component of the present catalyst whether employed in a supported or non-supported form is a carbonaceous phase. This carbonaceous phase, exclusive of the support phase, in general has a carbon content of 50% by weight or more, and preferably 60% to 99% with the remainder being largely hydrogen or hetero atoms, and with only minor or trace proportions of metals. The higher proportions of carbon occur when there is a small content of atoms other than hydrogen and carbon present. The carbonaceous phase is characterized by a high degree of unsaturation as is indicated by a low atomic hydrogen/carbon ratio (herein referred to as the H/C ratio) in the carbonaceous phase. The H/C ratio is found to be no greater than 1.5 or, preferably no greater than 1.1, and most preferably 1.0 to 0.1.

Analysis of the carbonaceous phase derived from a hydrocarbon source indicates that it consists principally of carbon and hydrogen. However active compositions may also be produced with hetero atoms present such as oxygen, sulful, nitrogen, or halides. For example, the formation of a carbonaceous catalyst on a porous support of alpha alumina, when used as the substrate upon which condensation of quinone $C_6H_4O_2$, to a carbonaceous phase occurs in the catalytic reactor in the absence of added oxygen or hydrogen. This results in the production of a carbonaceous catalyst which upon analysis is found to contain measureable quantities of oxygen. Similarly quinoline $C_9H_7N$ leads to a catalyst containing substantial nitrogen, while carbonization of thiophene $C_4H_4S$ produces a catalyst containing sulfur. In each case, however, the H/C atom ratio is no greater than 1.5, usually no greater than 1.1.

In addition to the forms of dispersed carbon described above as resulting from the condensation of unsaturation organic molecules at high temperatures, there are other sources which yield the desired dispersed carbon. In addition to the starting components comprising unsaturated molecules, generally introduced as gaseous species of nonpolymerized molecules, another source comprises polymeric components which are subjected to pyrolysis possible forming more-unsaturated molecular species in order to obtain the dispersed carbon. This pyrolysis step may be conducted in vacuum, in inert atmospheres such as nitrogen or when desired, in atmospheres having oxygen containing molecules, such as oxygen, water, carbon dioxide or carbon monoxide present. For example, the deposition of carbon may be conducted by dissolving an organic polymer such as polystyrene, suitably having a molecular weight of 5,000 to 500,000 which is dissolved in a suitable solvent such as benzene or dioxane. A suitable solution contains from 1% to 50% by weight of the polymer. The solution of the polymer is then applied to a porous, low acidity support such as alumina, magnesia, or kielselguhr and the solvent removed by heat or applying a vacuum so that the polymer is uniformly deposited on the support. The composite is then dried and subjected to pyrolysis for example by the application of heat to subject the composite to a temperature of from 200° C. to 800° C. to form the catalytically active carbonaceous phase.

In the use of organic polymers to provide a dispersed phase of carbon, the organic polymer may consist of hydrocarbon species such as polystyrene, polymethylstyrenes, polyethylene, polypropylene as well as polymers containing hetero atoms such as polyacrylonitrile, polymethacrylonitrile, polymethylmethacrylate and other hetero atoms such as sulfur or halogens for example chlorine e.g., from polyvinyl chloride or fluoride as well as small amounts of transition metal ions. These materials may be employed as monomers, copolymers, homopolymers, terpolymers, etc.

In addition to the supports specifically mentioned above, the various porous supports described previously, particularly the inert oxides and mixed oxides of aluminum, silicon, magnesium, zirconium, titanium, etc. are desirable. It is preferred that the porous carrier bodies existing as random pieces, pellets, extruded or cast forms etc. have the volume of pores which are smaller than 100 Angstroms restricted to a volume which does not exceed 0.3 ml./g. of support and more preferably should not exceed 0.2 ml./g. of support. It is also preferred that these supports be characterized by low acidity as described herein. In contrast to the present condensed carbon sources, an activated carbon from a bituminous coal source having a surface area of 1000 square meters per gram and a volume of pores of 100 A. of about 0.3 ml./g., gives very poor selectivity, e.g., 38% selectively at 8% conversion in the dehydrogenation of ethylbenzene to styrene. This is attributed to the deleterious effect of small pores on selectivity, since the same reaction with the same reactions conditions when conducted over a catalyst of 12.5 wt. percent carbon on gamma alumina exhibits a selectivity of 96% at 43% conversion. The conversion is defined as the fraction of the feed converted to styrene, and the selectivity is defined as the ratio of conversion to styrene relative to total conversion.

The carbonaceous catalyst of the present invention is distinguishable from prior art coke deposits such as those which occur on cracking catalysts, or in thermal cracking, or activated carbons in that the present catalysts have paramagnetism that is higher in concentration (unpaired spins per C atom) than the carbon of coke deposits; furthermore the present carbon is more effective and selective in catalytic character. Such paramagnetism is determined by electron spin resonance (ESR) absorption. It is obvious that carbon, activated carbon, chars, and various carbonaceous compositions in general may be prepared in many different ways and with many different properties, many of which have varying levels of paramagnetism. The active catalysts in the present invention however have been found to be quite strongly paramagnetic, with the following properties indicating the general range of the measurements made on the ESR spectrometer.

(A) The g. (spectroscopic splitting factor) values are in the range of 2.0 to 2.1, preferably in the range of from 2.00 to 2.01.

(B) The spin concentrations are in the range of $1 \times 10^{-1}$ to $1 \times 10^{-5}$ spins per carbon atom.

(C) The line widths may be as broad as 100 gauss but are preferably no greater than 10 gauss in width.

The following example shows the determination of the magnetic properties of the catalyst of Example 1 described below. The spent catalyst removed from the reactor after the completion of the run is evacuated to remove adsorbed gases and is then used as a sample for measurement in an electron spin resonance spectrometer. The g. value is found to be 2.0027 and the line width 0.5 gauss. The signal is very intense, indicating a high spin concentration. The spectrum is measured at 9.5 gc./sec. using a Varian V4502 X-band spectrometer equipped with a Varian Fieldial calibrated sweep and having a 6-inch magnet. The sample is measured in a quartz tube. The g. value is determined by comparison with crystalline diphenylpicrylhydrazyl.

In the above described test runs on the dehydrogenation of ethylbenzene to styrene over (1) activated carbon and (2) 12.5 wt. percent carbon on low acidity (0.1 factor) gamma alumina, the spin concentrations (spins/carbon atom) are as follows:

|  | Spin concentration |
|---|---|
| (1) Activated carbon | $8.2 \times 10^{-6}$ |
| (2) Carbon on alumina | $3.1 \times 10^{-4}$ |

The combination catalyst of the present invention including the above described low acidity support with carbon dispersed thereon is prepared by producing the carbon layer in situ by the condensation of a suitable hydrocarbon feedstock such as an olefinic hydrocarbon having from 2 to 20 carbon atoms e.g., styrene, butylene, propylene, butadiene, eicocene and other feedstocks described above. The preliminary condensation to obtain the carbon is carried out in a temperature in the range of from 200° C. to 1400° C. or preferably from 300° C. to 900° C., and still more preferably from 400° C. to 800° C.

It has been found that the above prepared catalyst consisting of the carrier together with from 0.1 weight percent to 30 weight percent of deposited carbon upon a carrier, or the carbon used in unsupported form (up to 95 wt. percent carbon with the remainder being hydrogen, oxygen, sulfur, halides, etc.) is characterized by an exceedingly good lifetime when used for dehydrogenation reactions such as the dehydrogenation of butane to butylenes, and propane to propylene, dehydrogenation of ethylbenzene to styrene as well as the dehydrogenation of normal dodecane to linear dodecenes as well as dehydrogenation of olefins to diolefins for example butylenes to butadienes.

Other reactions which are effectively catalyzed by the present carbon catalyst include dehydrocyclization, for example of paraffins (e.g. 6 to 8 carbon atoms) such as heptane to toluene, and as well as $C_8$ paraffins to ethylbenzene and xylenes. When the carbon on a low acidity support, e.g. gamma alumina containing sodium is used in conjunction with an acidic component, for example silica-alumina, the combined catalyst is useful in reforming, e.g. light naphthas to high octane gasoline and the conversion of methylcyclopentane to benzene; and also isomerization, for example, the conversion of paraffins to isoparaffins such as n-octane to iso-octane. Another use of the carbon catalyst having an acidic component is in the hydrocracking of gas oils to gasoline fractions in the presence of hydrogen.

In this group of reforming, isomerizing and hydrocracking, the operation is conducted with a catalyst, comprising an admixture of the two components:

(a) 0.1 to 30% by weight, referred to the composite catalyst, of carbon deposited by the condensation of unsaturated hydrocarbons on a low acidity support having an acidity factor of no more than 2.0, and (b) a high acidity support, having an acidity factor of no less than 3.0.

Each of the (a) and (b) components can be present at 10% to 90% by weight of the catalyst composite.

The catalyst as described above is useful in fixed bed operations in which the feedstock is passed through a bed of the catalyst maintained at the desired temperatures. Inasmuch as dehydrogenation and other reactions contemplated by the present invention are generally endothermic, heating elements may be employed to maintain the reaction temperature. The present catalysts are also suitable for use in fluid bed reaction systems in which the catalyst particles are suspended in a gaseous stream of the reactants e.g. the hydrocarbon feedstock, and any diluent gases such as nitrogen or steam. This method of operation can be carried out in a reaction vessel provided with standpipes for the movement of the catalyst which may be withdrawn for regeneration, if desired.

The process of employing the present catalyst, formed by the deposition of the carbon upon the support or the walls within the reactor, consists of passing the feedstock for example ethylbenzene over the desired surface at a dehydrogenating temperature e.g. from 400° C. to 800° C., preferably 450° C. to 700° C., and withdrawing the product from the reactor. A diluent gas such as hydrogen, nitrogen, carbon dioxide, steam, etc. may be used together with the feedstock in any desired proportion such as from 0.5 to 30 volumes of diluent per volume of the reactant.

The use of a diluent in dehydrogenation and other processes such as the production of styrene from ethylbenzene is desirable for two purposes. In the conventional reaction not only is the diluent necessary to provide the major part of the heat input, but also to control the equilibrium e.g., the diluting effect of a large volume of inert gas shifts the equilibruim so that a larger degree of conversion of ethylbenzene to styrene is possible thermodynamically. Limiting the extent of the reverse reaction in the conventional styrene process also requires the use of the highest possible temperatures.

The use of steam, as well as other diluents such as nitrogen, carbon monoxide, carbon dioxide or methane is thus desirable in the above described reactions from the point of view of shifting the equilibrium so that a higher degree of conversion is possible at a given temperature. Steam is, however, unique in that it carries a very large amount of heat input required for the endothermic reactions; however the still greater advantage in the use of steam in the present reactions is that it greatly reduces, or even eliminates catalyst deactivation by reacting with additional coke formed during the reaction, thus eliminating catalyst deactivation.

In contradistinction to the above considerations, conventional catalysts such as promoted synthetic iron ore are inferior to the present carbon catalyst which accomplishes the dehydrogenation of ethylbenzene, for example, with greater selectivity, so that side reactions leading to toluene and benzene occur to a far lesser degree. Consequently yields of styrene are higher.

It has been found that the present carbon catalyst is characterized by a greater selectivity at any level of conversion than is characteristic of conventional metal catalysts. An example of the present catalyst is the composite on low acidity alumina, of carbon deposited by the condensation of styrene. When utilizing the carbon-alumina catalyst for the conversion of ethylbenzene to styrene at 40% conversion, the selectivity can reach 96%. In contrast thereto the use of a conventional dehydrogenation catalyst such as potassium promoted synthetic iron oxide when operated at 40% conversion in a commercial plant gives a selectivity of only 91%.

In the various hydrocarbon conversion processes of the present invention it is frequently desirable to employ various diluents supplied with the feed to the catalytic reactor. Inert diluents such as nitrogen, steam, carbon monoxide, carbon dioxide or various combustion streams which include hydrogen, as well as methane may be used in the present process. It is found that in the hydrocarbon modifying processes described herein in which catalyst deactivation occurs such as by coke deposition, it is characteristic of the present catalyst that the deactivation rate is noticeably lower than the deactivation rate obtained with noble metal catalysts such as platinum on alumina used at conditions giving comparable conversions.

The present hydrocarbon convresion reactions may also be conducted using hydrogen as a diluent since it has been found that hydrogen also reduces the deactivation of the catalyst.

The preferred diluent in conducting the above reactions, particularly for long runs without the necessity of regenerating the catalyst, has been found to be steam. Furthermore the use of steam has been found to result in the least deactivation of the catalyst over long periods of time. It is found by examination of catalyst compositions removed from the reactors when conducting the above described hydrocarbon modifying processes that the carbonaceous composition formed in the absence of steam is quite refractory and resistant to later removal by steam. It is found that the presence of steam prevents the deposition of large quantities of additional coke which would otherwise deactivate the catalyst. The use of steam as a diluent in the present processes also makes it desirable in some instances to employ promoters to enhance the effect of the water gas reaction by which the steam reacts with newly deposited coke to at least partially remove or clear the additional coke from the catalytic surface. Preferred promoters in this relationship are the alkali metals such as sodium, potassium, rubidium and lithium employed in the proportion of from 0.1% to 10% by weight of the entire catalytic composition. Furthermore the presence of alkali metals leads to the formation of more active carbon-containing dehydrogenation catalysts.

One embodiment of the invention is to carry out a continuous reaction, sustainable over long periods of time in which the level of carbon content is maintained substantially constant. This may be accomplished by control of the temperature, even without steam, so that the preliminarily formed carbon e.g. deposited at a relatively high temperature such as from 400° C. to 1400° C. functions as the active catalyst for lower temperature dehydrogenation reaction conditions such as at temperatures of from 400° C. to 800° C.

Further control of the amount of carbon present in the reactor may be carried out by the use of steam as a diluent. In this instance, presence of the steam promotes the water gas reaction with the consequent removal of carbon. Accordingly the continuous deposition of small proportions of fresh catalytic carbon is in balance with the removal of carbon, so that the reaction may be carried out for long periods of time without substantially increasing the amount of carbon present.

In a preferred embodiment of this invention, carbon is dispersed upon a low acidity support material. The acidity of the support useful herein is of considerable importance as is illustrated herein below. Although the carriers of the present invention are usually of low acidity as determined by many of the ordinary known techniques for determining the acid equivalent of such support materials, not all carriers having such low acidity have been found satisfactory in the present invention. Thus, in defining the low acidity characteristics of the carriers of the present invention it has been found necessary to use methods other than those more commonly in general use for determining acidity. To attain this end, the use of a model reaction has been found to provide a satisfactory method of measuring acidity. The use of model reactions to define the limitations of a catalytic material is a well recognized technique as is discussed in Journal of the American Chemical Society, vol. 82, p. 2471 and 2483 [1960]. The acidity of the carriers of the present invention is defined herein in terms of an "acidity factor." This acidity factor is determined by placing the carrier or support in a small reaction chamber in contact with a hydrocarbon mixture of 92 percent by weight n-dodecane and 8 percent by weight n-alpha dodecene and hydrogen in a mole ratio of one part hydrocarbon mixture to two parts of hydrogen. The conditions in the reactor are maintained at a temperature of 435 to 440° C., a pressure of atmospheric pressure, ±2 p.s.i., and a space velocity of the hydrocarbon mixture of 4.65 LHSV. The product of this model reaction is then passed through a gas chromatograph in which the chromatographic column is packed with a substrate suitable for separating the product mixture according to boiling point and polarity; for example, Chromosorb W, which is a flux-calcined diatomaceous earth, treated with Carbowax 20 M plus minor amounts of silver nitrate, provides a suitable and preferred substrate. The weight percent concentration of materials in the product which are eluted from the gas chromatograph prior to n-dodecane represents the acidity factor used herein. The materials eluted from the gas chromatograph ahead of n-dodecane are components lower boiling than n-dodecane and which do not have such polarity as to be held by the adsorbent in preference to n-dodecane. In accordance with the present invention, if the weight concentration of these components eluted before n-dodecane in the product is 10 weight percent, then the acidity factor of the carrier would be expressed as 10. In the practice of the present invention in dehydrogenation, dehydrocyclization, and hydrogenation, the carriers or supports for the catalyst are preferably of low acidity, the acidity factor generally being no more than 2.0. Still more preferably, the low acidity alumina carriers or supports of the present invention possess an acidity factor of no more than 1.0. The acidity factor measurement used herein is considered to be critical since those carriers or supports having acidity factors in excess of the above limits have less dehydrogenation, dehydrocyclization and hydrogenation utility in the practice of the present invention without some further preparatory treatment either to the carrier or to the carrier-carbon composite. This treatment may take the form of the incorporation of greater than 0.1% by weight of an alkali or alkine earth metal in the support or other such methods in order to lower the acidity factor to the desired value. High acidity components are however useful in conjunction with the present carbon-low acidity components to provide a composite catalyst useful for reforming isomerization and hydrocracking. Such high acidity components have an acidity factor of no less than 3.

Though the above disucussion has suggested measurement of the acidity factor of the non-carbon-deposited support, it is, of course, within the present invention that the acidity factor may be measured on the finished carbon-deposited catalyst. The determination of the acidity factor of the finished catalyst is by the use of the above described model reaction, and shows the there is substantially no change as the result of carrying out the above described reactions.

In addition to the acidity limitations on the alumina and other carriers or supports of the present invention, these materials preferably also meet certain other criteria. The carriers useful in the present invention generally possess a surface of 50 to 350 square meters per gram. (BET method by adsorption of nitrogen as described by Brunauer, Emmett and Teller, Journal of the American Chemical Society, vol. 60, page 309 et seq. 1938.)

Generally, the carriers of the present invention have a macropore volume (pores larger than 100 Angstroms) of at least 0.05 ml./g. Preferably, however, the macropore volume of the carriers most useful in the present invention is at least 0.07 ml./g. Macropore volume, as used herein, refers to the total volume of pores within the alumina or other carrier having a pore radius of greater than 100 Angstroms, per unit weight of carrier. The macropore volume is expressed in terms of milliliters, per gram of alumina, of pores having a radius greater than 100 Angstroms. Another desirable criterion of the carrier is that the micropore pore volume (i.e., pores smaller than 100 Angstroms) does not exceed 0.3 ml./g. of support, and more preferably does not exceed 0.2 ml./g. of support. The use of supports meeting these limitations as to macropore and micropore volume and surface area contributes significantly to the control of the steady state level of the carbon content of the catalyst composition. The micropore volume is determined by the BET method described above. The macropore volume is determined by an Aminco-Winslow mercury porosimeter, Model 5–7107 (American Instrument Company) or equivalent mercury penetration apparatus and represents the internal volume penetration between 0 to 8000 p.s.i.g. A discussion of macropore volume determination is found in Industrial and Engineering Chemistry, vol. 17, 787 [1945].

In a preferred embodiment of the invention the carrier or support for the present catalyst composition comprises an alumina. It is preferred that the alumina be one which has been thermally stabilized. By thermal stability is meant that the alumina should withstand temperatures within the range of the intended reaction temperature for 12 hours without any significant reduction in surface area resulting therefrom.

The present catalyst has also been found to be improved by the addition thereto of compounds of alkali and alkaline earth metals which can be absorbed on the starting carrier base or upon the carrier-carbon composite.

Among the alkali metals useful in the present invention are sodium, potassium, lithium, rubidium and cesium. The alkaline earth metals include particularly magnesium, calcium, barium, strontium, and beryllium. These metals are calculated as being free metals, although they may be present as various compounds, e.g., oxides or aluminates.

The amount of alkali metal or alkaline earth metal present in the catalyst of the present invention is most often within the range of from approximately 0.10 to 10 percent by weight of the total catalyst composition. However, it is usually preferred that the amount of alkali or alkaline earth metal present in the catalyst be within the range of from approximately 0.20 to 8.0 percent by weight of the total catalyst composition.

The alkali or alkaline earth metal may be placed on the alumina or other support, including the support-carbon composite by such conventional methods as co-precipitation, impregnation and the like. In a particularly useful manner of incorporating the alkali or alkaline earth metal into the support, an alkali or alkaline earth metal salt is first dissolved in a suitable solvent, preferably water when possible. The carrier, with, or without carbon deposited thereon, is then either totally immersed in the solution or is treated with just enough of the solution to obtain the desired amount of the promoter.

The following examples illustrate specific embodiments of the present invention.

EXAMPLE 1

Approximately 130 ml. of ⅛ inch cylindrical tablets of a gamma alumina support having a surface area (BET)

of 74 m.²/g., a macropore volume (pores greater than 100 angstroms) of 0.12 ml./g. and a micropore volume of about 0.20 ml./g. of pores not greater than 100 angstroms, and an acidity factor of 0.1 (defined herein) are charged to a 24-inch long reaction chamber having a catalyst space approximately 10 inches in length and 1 inch in diameter. A hydrocarbon feedstock comprising 66.3 wt. percent ethylbenzene, 32.1 wt. percent styrene, 1.3 wt. percent toluene, 0.2 wt. percent benzene and 0.1 wt. percent other hydrocarbons is then passed into the reaction chamber concurrently with nitrogen as a diluent in a mole ratio of nitrogen to hydrocarbon of 7.5:1. The temperature within the reaction chamber is maintained near 540° C. A pressure of substantially atmospheric pressure is maintained within the reaction chamber. The liquid hourly space velocity (LHSV) of the hydrocarbons is 0.22 hr.$^{-1}$. After a period of 30 hours run time the preparation of the carbon deposited catalyst is complete. During this period carbonaceous matter which is the active catalyst is deposited on the alumina in the amount of about 10 wt. percent by the condensation of the unsaturated hydrocarbons.

After 30 hours of catalyst preparation the synthesis of styrene from ethylbenzene is begun. The ethylbenzene feedstock comprises 98.2 wt. percent ethylbenzene and 1.8 wt. percent other hydrocarbons with the benzene, toluene and styrene percentages each being 0.005 wt. percent. The conditions of the styrene synthesis phase of the run are identical to those of catalyst preparation except that ethylbenzene feedstock replaces the other hydrocarbon feedstock and the carbon content of the catalyst is 10-15 wt. percent, with acidity factor remaining substantially constant during the 66 hours of styrene synthesis run time. During this period the conversion of ethylbenzene to styrene ranges from 34 to 23 wt. percent and selectivity of styrene averages 96 wt. percent of the total products.

For comparison, the styrene synthesis is conducted under the same reaction conditions with a 0.4 wt. percent platinum on alumina catalyst. The alumina support is identical to that used for the carbon catalyst described above. Lower activity is observed, e.g. the initial conversion to styrene is 28% with a 93% selectivity, for the platinum catalyst, compared to 34% conversion with a 96% selectivity for the carbon catalyst.

The carbon-alumina catalyst has a substantial concentration of unpaired electrons, $3.1 \times 10^{-4}$ spins per carbon atom as measured by electron spin resonance with a g. value of 2.0027. In contrast, the platinum-alumina has an insignificant concentration of unpaired electrons.

EXAMPLE 2

Approximately 130 ml. of ⅛ inch magnesium oxide pellets are charged to a 24-inch long reaction chamber having a catalyst space approximately 10 inches in length and 1 inch in diameter. The pellets which are composed of 98 wt. percent MgO and 2 wt. percent Al$_2$O$_3$ have a surface area (BET) of about 21 m.²/g. and a macropore volume (over 100 A.) of about 0.12 ml./g. and a micropore (less than 100 A.) pore volume of about 0.19 ml./g. The reaction conducted in the present example is one of dehydrocyclization preceded by a 1.2 vinyl shift. A 2,4,4-trimethylpentene-2 feedstock is passed into the reaction chamber concurrently with nitrogen as a diluent in a mole ratio of nitrogen to hydrocarbon of 0.9:1. The temperature within the reaction chamber is maintained at about 480° C. A pressure of substantially atmospheric pressure is maintained within the reaction chamber. The liquid hourly space velocity (LHSV) of the 2,4,4-trimethylpentene-2 is 0.50 hr.$^{-1}$. The active catalyst is the carbonaceous matter deposited on the surface of the magnesia during the run by the condensation of a portion of the olefinic feedstock. Such carbon deposition occurs simultaneously with the development of catalytic activity for the conversion of 2,4,4-trimethylpentene-2 to para xylene which begins to be detected after about 1 hr. At the end of 48 hours run time the carbon content of the catalyst is about 6 wt. percent, the conversion to para xylene is 2.2 wt. percent and the amount of para xylene in the xylene fraction of the products is greater than 99. wt. percent.

When this example is repeated using eta alumina as the support (surface area equals 200 square meter/g., pores less than 100 Angstroms amount to 0.25 ml./g., and acidity factor about 0.2), a similar result is obtained.

The carbon combination catalyst utilizing either the magnesia or alumina as the base is also an effective catalyst for dehydrocyclization withotu skeletal isomerization. For example at about 530° C. it promotes the conversion of n-heptane to toluene.

EXAMPLE 3

Approximately 130 ml. of ⅛ inch cylindrical tablets of an eta alumina support having a surface area (BET) of 94 m.²/g., a macropore volume of about 0.11 ml./g. and a micropore volume of 0.30 ml./g. of pores smaller than 100 Angstroms, and an acidity factor of 0.1 (defined herein) are charged to a 24-inch long reaction chamber having a catalyst space approximately 10 inches in length and 1 inch in diameter. A hydrocarbon feedstock comprising 66.3 wt. percent ethylbenzene, 32.1 wt. percent styrene, 1.3 wt. percent toluene, 0.2 wt. percent benzene and 0.1 wt. percent other hydrocarbons is then passed into the reaction chamber concurrently with nitrogen as a diluent in a mole ratio of nitrogen to hydrocarbon of 7.5:1. The temperature within the reaction chamber is maintained near 540° C. A pressure of substantially atmospheric pressure is maintained within the reaction chamber. The liquid hourly space velocity (LHSV) of the hydrocarbons is 0.22 hr.$^{-1}$. After a period of 30 hours run time the preparation of the carbon deposited catalyst is complete. During this period carbonaceous matter which is the active catalyst is deposited on the alumina in the amount of about 10 wt. percent carbon.

After 30 hours of catalyst preparation, the synthesis of styrene from ethylbenzene is begun. The ethylbenzene feedstock comprises 98.2 wt. percent ethylbenzene and 1.8 wt. percent other hydrocarbons, the benzene, toluene and styrene percentages each being 0.005 wt. percent. The conditions of the styrene synthesis phase of the run are identical to those of catalyst preparation except that ethylbenzene feedstock replaces the other hydrocarbon feedstock and the carbon content of the catalyst is 10-15 wt. percent during the 66 hours of styrene synthesis run time. During this period the conversion of ethylbenzene to styrene ranges from 34 to 23 wt. percent and selectivity of styrene averages 96 wt. percent of the total products.

When this example is repeated using a promoter, namely 1% copper (metallic basis) obtained from copper nitrate deposited upon the alumina, the properties of surface area and small pore volume are substantially unchanged. The effectiveness for dehydrogenation is substantially unchanged.

EXAMPLE 4

A catalyst is prepared as in Example 1 except that the period of run time is 19 hours for preparation of the catalyst. At the end of this time the carbon content of the catalyst is about 10 wt. percent. After the catalyst is prepared, an ethylbenzene feedstock comprising 98.2 wt. percent ethylbenzene and 1.8 wt. percent other hydrocarbons (benzene, toluene and styrene percentages each being 0.005 wt. percent) is passed into the reaction chamber concurrently with steam as a diluent in a mole ratio of steam to hydrocarbon of 8.5:1. The temperature within the reaction chamber is maintained near 570° C. at substantially atmospheric pressure. The liquid hourly space velocity (LHSV) of the ethylbenzene is 0.12 hr.$^{-1}$. During the 25-hour period of synthesis run time the conversion of ethylbenzene to styrene average 43 wt. percent and the selectivity of styrene is 91 wt. percent of the total products. In this run, the final carbon content of the composite catalyst is 11.5 wt. percent.

When this example is repeated, using titania as the support, and hexene-1 as the carbon source during carbon deposition, the production of styrene from ethylbenzene gives a similar result to that described above. In this modification, the catalyst support has an acidity factor of 0.7, a surface area of 10 m.$^2$/g., while the volume of pores smaller than 100 Angstroms is about 0.15 ml./g.

In using steam as the diluent, there is found to be a continuous production of carbon monoxide. Although the final amount of carbon does not change significantly the catalyst is self regenerating, so that long runs can be conducted without removing the catalyst from the reactor.

EXAMPLE 5

A catalyst is prepared as in Example 1, except that the gamma alumina support is modified by the addition of 2% Na derived from the impregnation of sodium nitrate followed by calcination. The carbonization is conducted as in Example 1, except that the preparation of the carbon-containing catalyst is completed in 6 hours. The synthesis of styrene from ethylbenzene is started after the 6 hour preparation period, by charging ethylbenzene feedstock with steam as a diluent. The mole ratio of steam to ethylbenzene is 7.5:1. The temperature is 540° C. and the LHSV of ethylbenzene is 0.24 hr.$^{-1}$. The conversion to styrene is 36.5% with a selectivity of 96.5%. When the LHSV is changed to 0.12 hr.$^{-1}$, the conversion to styrene is 41% with a selectivity of 96%. It is observed that the rate of deactivation using steam as diluent is much less than when using nitrogen as diluent with the same catalyst and reaction conditions.

EXAMPLE 6

A catalyst is prepared as in Example 1 but with butene-1 as the source of deposited carbon, which occurs at a proportion of 12% by weight of the composite with gamma alumina. After the catalyst is prepared, an ethylbenzene feedstock comprising 98.2 wt. percent ethylbenzene and 1.8 wt. percent other hydrocarbons, the benzene, toluene and styrene percentages each being <0.005 wt. percent, is passed into the reaction chamber concurrently with nitrogen as a diluent in a mole ratio of nitrogen to hydrocarbon of 7.5:1. The temperature within the reaction chamber is maintained at about 540° C., with the pressure substantially atmospheric. The liquid hourly space velocity (LHSV) of the ethylbenzene is 0.11 hr.$^{-1}$. During a 28-hour period of synthesis run time the conversion of ethylbenzene to styrene averages 33 wt. percent and the selectivity of styrene is 95 wt. percent of the total products.

When this example is repeated, using alpha alumina to which 1 wt. percent sodium (from sodium nitrate) has been added as the support (surface area about 1 square meter/g. pores less than 100 A. amount to 0.10 ml./g., and acidity factor about 0.2), slightly improved selectivity is obtained.

EXAMPLE 7

A catalyst is prepared by carbon deposition on gamma alumina (acidity factor of 0.1) from contacting of butene-1 at 540° C. for 27 hours. This catalyst is tested for butadiene synthesis at 540° C. using a gas space velocity of 7 minute$^{-1}$. The feed consists of butene-1 diluted with 3 volumes of nitrogen. The result is an 8.2% conversion to butadiene with a selectivity of 80%.

When the feedstock is isoamylene (98% pure), and the same catalyst and reaction conditions are employed, a conversion to isoprene of 10% results, with a selectivity of 81%.

EXAMPLE 8

A catalyst is prepared as in Example 1 except that the run time is 19 hours for preparation of the catalyst. At the end of this time the carbon content of the catalyst is about 10 wt. percent. After the catalyst is prepared, a n-dodecane feedstock comprising 99.3 wt. percent n-dodecane, 0.67 wt. percent lower boilers and 0.02 wt. percent higher boilers is passed into the reaction chamber concurrently with nitrogen as a diluent in a mole ratio of nitrogen to hydrocarbon of 4.8:1. The temperature within the reaction chamber is maintained at about 515° C., with the pressure at substantially atmospheric. The liquid hourly space velocity (LHSV) of the n-dodecane is 0.67 hr.$^{-1}$. During a 52-hour period of synthesis run time the conversion of n-dodecane to n-dodecenes averages 9 wt. percent and the selectivity to n-dodecenes is 50 wt. percent of the total products. A similar result is obtained when the feedstock consists of a mixture of $C_{10}$ to $C_{15}$ normal alkanes.

When this example is repeated, using alpha alumina as the support (surface area equal about 1.0 square meter/g.; pores less than 100 A. amount to 0.05 ml./g., and acidity factor about 0.2) a similar result is obtained.

The two types of alumina with carbon also show hydrocracking catalytic effects at higher temperatures, e.g. about 600° C. when charging a $C_{20}$ average composition gas oil with a 10:1 ratio of hydrogen to hydrocarbon to yield a product boiling predominantly in the gasoline range (400° F. endpoint).

EXAMPLE 9

A catalyst is prepared as in Example 1. This carbon-gamma alumina material is physically mixed with an equal weight of silica-alumina (about 12 wt. percent silica) particles of the same size. This mixed catalyst containing about 5 wt. percent carbon is used with a feedstock of methylcyclopentane in a reforming process. The feed is passed into the reaction chamber concurrently with hydrogen as a diluent in a mole ratio of hydrogen to hydrocarbon of 5:1. The temperature within the reaction chamber is maintained at about 540° C., with a pressure of about 700 p.s.i. (total). The liquid hourly space velocity (LHSV) of the methylcyclopentane is 0.5 hr.$^{-1}$. During a 100-hour run time the conversion of methylcyclopentane to benzene averages 50 wt. percent with a selectivity of 80%.

When the above catalyst is used for isomerizing n-octane to isooctane under similar reaction conditions, comparable conversion and selectivity are obtained. The above carbon containing combination catalyst also shows hydrocracking catalytic effects when charging a $C_{20}$ average composition naphthenic gas oil with 10:1 mole ratio of hydrogen to hydrocarbon to yield a lower molecular weight product boiling in the gasoline range (400° F. endpoint).

EXAMPLE 10

A catalyst is prepared as in Example 1 except that the period of run time is 20 hours for preparation of the catalyst. At the end of this time the carbon content of the catalyst is about 10 wt. percent. After the catalyst is prepared, a n-butane feedstock comprising 98.94 wt. percent n-butane, 0.97 wt. percent 2-methylpropane and 0.09 wt. percent of other hydrocarbons is passed into the reaction chamber concurrently with nitrogen as a diluent in a mole ratio of nitrogen to hydrocarbon of 2:1. The temperature within the reaction chamber is maintained at about 540° C., at substantially atmospheric pressure. The gas hourly space velocity (GHSV) of the n-butane is 38 hr.$^{-1}$. During a 16-hour period of synthesis run time the conversion of n-butane to n-butenes is 8.6% (wt.) and to 1,3-butadiene is 0.8% (wt.) and the selectivity to n-butenes+1,3-butadiene is 73 wt. percent of the total products.

When this example is repeated, using titania as the support, and hexene-1 as the carbon source during carbon deposition, a similar result is obtained. In this modification, the catalyst has an acidity factor of 0.3, a surface area of 10 m.²/g., while the volume of pores smaller than 100 Angstroms is about 0.15 ml./g.

Another modification is to use steam (5:1 mole ratio to feed) as a diluent. In using steam as the diluent, there is found to be a continuous production of carbon monoxide. Although the final amount of carbon does not change significantly, the catalyst is self regenerating, so that long runs can be conducted without removing the catalyst from the reactor.

EXAMPLE 11

A catalyst is prepared as in Example 1 except that the period of run time is 20 hours for preparation of the catalyst. At the end of this time the carbon content of the catalyst is about 10 wt. percent. After the catalyst is prepared, a propane feedstock comprising 99.2% propane, 0.6 wt. percent ethane and 0.2% methane is passed into the reaction chamber with no diluent being used. The temperature within the reaction chamber is maintained at about 570° C. and with a pressure which is substantially at atmospheric pressure. The gas hourly space velocity (GHSV) of the gaseous feedstock is 40 hour$^{-1}$. During the 20 hour period of synthesis run time, the conversion of propane to propylene averages 15.6 wt. percent, and the selectivity to propylene is 78 wt. percent of the total products.

When this example is repeated, using granular, porous silicon carbide with 1% potassium (from potassium nitrate) as the support, and benzene as the carbon source during carbon deposition, a similar result is obtained. In this modification, the catalyst has an acidity factor of 0.1, a surface area of 0.5 m.²/g., while the volume of pores smaller than 100 Angstroms is about 0.03 ml./g.

Another modification is to use ethane (98% pure) as the feedstock over the above carbon-alumina catalyst with the dehydrogenation being conducted at 600° C. to yield ethylene at conversion to ethylene of 15% with a selectivity of 85%.

EXAMPLE 12

A catalyst is prepared as in Example 1. Since hydrogenation with the carbon-low acid carrier is most effective with a promoter, the composite catalyst generally employs from 0.1 to 2% by weight of a noble metal such as platinum, palladium, rubidium or rhenium; the present examples use 0.5 wt. percent of platinum referred to the catalyst composite. The carbon alumina is first formed. It is cooled and removed from the reactor after which platinum is impregnated on the carbon-alumina, using platinum diamino dinitrite. This promoted composite is dried at 100° C. and is then calcined at 300° C. in a hydrogen atmosphere. The platinum content is 0.5 wt. percent. This catalyst is a very active hydrogenation catalyst in a test reaction in which a feed comprising benzene diluted with hydrogen (5:1 mole ratio of hydrogen to benzene) is fed into a reactor at 100° C. at a rate LHSV of 1.0 hr.$^{-1}$. The conversion of benzene to cyclohexane is 98% with a selectivity of 100%.

What is claimed is:

1. A process for the chemical modification of hydrocarbons selected from the group consisting of paraffins, mono-olefins and alkyl aromatic hydrocarbons, which comprises contacting the said hydrocarbons at an elevated temperature, a pressure and contact time sufficient to produce more-unsaturated hydrocarbons, with a catalyst comprising from 0.1 to 30% by weight of carbon, referred to the composite catalyst, deposited by the condensation of unsaturated hydrocarbons, the said carbon being disposed upon a porous low acidity support having an acidity factor of no more than 2.0.

2. A process for the chemical modification of hydrocarbons selected from the group consisting of paraffins, mono-olefins and alkyl aromatic hydrocarbons having from 2 to 20 carbon atoms in the alkyl chain, which comprises contacting the said hydrocarbons at an elevated temperature, a pressure and contact time sufficient to produce more-unsaturated hydrocarbons, with a catalyst comprising from 0.1 to 30% by weight of carbon, referred to the composite catalyst, deposited by the condensation of unsaturated hydrocarbons, the said carbon being disposed upon a porous low acidity alumina support having an acidity factor of no more than 2.0.

3. Process as in claim 1 in which the hydrocarbon feedstock is ethylbenzene which is dehydrogenated to styrene.

4. Process as in claim 1 in which the hydrocarbon feedstock is normal butane which is dehydrogenated to normal butylenes.

5. Process as in claim 1 in which the hydrocarbon feedstock is propane which is dehydrogenated to propylene.

6. Process as in claim 1 in which the hydrocarbon feedstock is butylenes which are dehydrogenated to butadiene.

7. Process as in claim 1 in which the hydrocarbon feedstock is $C_{10}$–$C_{15}$ normal alkanes, dehydrogenated to $C_{10}$–$C_{15}$ linear olefins.

8. Process as in claim 1 in which the hydrocarbon feedstock is isoamylene which is dehydrogenated to isoprene.

9. Process as in claim 1 in which the hydrocarbon feedstock is ethane which is dehydrogenated to ethylene.

10. A process for the hydrocyclization of hydrocarbons selected from the group consisting of paraffins and olefins having from 6 to 20 carbon atoms, which comprises contacting the said hydrocarbons at an elevated temperature, a pressure and contact time sufficient to product aromatic hydrocarbons, with a catalyst comprising from 0.1 to 30% by weight of carbon, referred to the composite catalyst, deposited by the condensation of unsaturated hydrocarbons, the said carbon being disposed upon a porous low acidity support having an acidity factor of no more than 2.0.

11. Process as in claim 10 in which the hydrocarbon feedstock is n-heptane which is dehydrocyclized to toluene.

12. Process as in claim 10 in which the hydrocarbon feedstock is diisobutylene which is dehydrocyclized to p-xylene.

13. Process as in claim 10 in which the hydrocarbon feedstock is n-octane which is dehydrocyclized to ethylbenzene and xylenes.

14. A process for the hydrogenation of hydrocarbons selected from the group consisting of olefins and aromatic hydrocarbons, which comprises contacting the said hydrocarbons with hydrogen at an elevated temperature, a pressure and contact time sufficient to produce more-saturated hydrocarbons, with a catalyst comprising from 0.1 to 5% by weight of a metal compound selected from the group consisting of alkali and alkaline earth metal compounds, and from 0.1 to 30% by weight of carbon, referred to the composite catalyst, deposited by the condensation of unsaturated hydrocarbons, the said carbon being disposed upon a porous low acidity support having an acidity factor of no more than 2.0.

References Cited

UNITED STATES PATENTS

| | | | |
|---|---|---|---|
| 2,428,715 | 10/1947 | Marisic | 208—113 |
| 2,742,406 | 4/1956 | Post | 208—112 |
| 3,120,484 | 2/1964 | Mills et al. | 208—120 |

OTHER REFERENCES

Catalysis, Berkman et al., pp. 482–487, Reinhold Publishing Corp., New York 1940.

DELBERT E. GANTZ, *Primary Examiner.*

T. H. YOUNG, *Assistant Examiner.*

U.S. Cl. X.R.

252—447; 260—673.5, 676, 680, 683.3, 683.9